(12) United States Patent
Alvarez-Icaza Rivera et al.

(10) Patent No.: US 9,992,057 B2
(45) Date of Patent: Jun. 5, 2018

(54) YIELD TOLERANCE IN A NEUROSYNAPTIC SYSTEM

(71) Applicant: INTERNATIONAL BUSINESS MACHINES CORPORATION, Armonk, NY (US)

(72) Inventors: Rodrigo Alvarez-Icaza Rivera, San Jose, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 14/262,592

(22) Filed: Apr. 25, 2014

(65) Prior Publication Data

US 2016/0323137 A1 Nov. 3, 2016

(51) Int. Cl.
*H04L 12/24* (2006.01)
*G06F 11/00* (2006.01)
(Continued)

(52) U.S. Cl.
CPC .......... *H04L 41/0668* (2013.01); *G06F 11/00* (2013.01); *G06N 3/049* (2013.01); *G06N 3/063* (2013.01); *H04L 41/0659* (2013.01)

(58) Field of Classification Search
CPC ....... H01L 2224/73265; H01L 2224/97; H01L 2924/00; H01L 2224/32145; H01L 2224/48227; H01L 2224/48091; H01L 2924/00012; H01L 2924/0002; H01L 2924/00014; H01L 2224/131; H01L 2224/32225; H01L 2224/48145; H01L 2924/181
(Continued)

(56) References Cited

U.S. PATENT DOCUMENTS 6,966,012 B1 * 11/2005 Gandhi ................. G11C 29/44
                                                                   714/6.32
2012/0064493 A1    3/2012 Howard et al.
(Continued)

OTHER PUBLICATIONS

Akopyan, F. et al., "Biologically-Inspired Cognitive Computing", Asynchronous VLSI and Architecture, 2011, pp. 1-3, Cornell University, United States.
(Continued)

*Primary Examiner* — Marsha D. Banks Harold
*Assistant Examiner* — Natasha W Cosme
(74) *Attorney, Agent, or Firm* — Sherman IP LLP; Kenneth L. Sherman; Hemavathy Perumal

(57) ABSTRACT

Embodiments of the invention provide a neurosynaptic network circuit comprising multiple neurosynaptic devices including a plurality of neurosynaptic core circuits for processing one or more data packets. The neurosynaptic devices further include a routing system for routing the data packets between the core circuits. At least one of the neurosynaptic devices is faulty. The routing system is configured for selectively bypassing each faulty neurosynaptic device when processing and routing the data packets.

20 Claims, 11 Drawing Sheets

(51) Int. Cl.
*G06N 3/04* (2006.01)
*G06N 3/063* (2006.01)

(58) Field of Classification Search
USPC .......................................................... 370/221
See application file for complete search history.

(56) References Cited

U.S. PATENT DOCUMENTS

| | | | |
|---|---|---|---|
| 2012/0188867 A1* | 7/2012 | Fiorone | H04L 45/00 370/218 |
| 2013/0073491 A1 | 3/2013 | Izhikevich et al. | |
| 2013/0073499 A1 | 3/2013 | Izhikevich et al. | |
| 2015/0026110 A1* | 1/2015 | Srinivasa | G06N 3/049 706/25 |
| 2015/0286544 A1* | 10/2015 | Kadri | G06F 11/2043 714/13 |
| 2016/0314057 A1* | 10/2016 | De Oliveira | G06F 11/1484 |

OTHER PUBLICATIONS

Kaiser, T., "IBM Researcher Develop Neurosynpatic Chips for Cognitive Computing," Aug. 28, 2011, pp. 1-2, DailyTech LLC, United States.

List of IBM Patents or Applications Treated as Related: filed Apr. 10, 2018, U.S. Appl. No. 15/950,037.

* cited by examiner

US 9,992,057 B2

YIELD TOLERANCE IN A NEUROSYNAPTIC SYSTEM

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, yield tolerance in a neurosynaptic system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses.

BRIEF SUMMARY

One embodiment of the invention provides a neurosynaptic network circuit comprising multiple neurosynaptic devices including a plurality of neurosynaptic core circuits for processing one or more data packets. The neurosynaptic devices further include a routing system for routing the data packets between the core circuits. At least one of the neurosynaptic devices is faulty. The routing system is configured for selectively bypassing each faulty neurosynaptic device when processing and routing the data packets.

Another embodiment of the invention provides a method of configuring a neurosynaptic network circuit. The method comprises providing a neurosynaptic network of neurosynaptic devices comprising multiple neurosynaptic core circuits and a routing system for communication between the neurosynaptic core circuits. The method further comprises identifying faulty neurosynaptic devices of the neurosynaptic network, and selectively disabling the faulty neurosynaptic devices by configuring the routing system to selectively bypass the faulty neurosynaptic devices when routing data between the neurosynaptic core circuits.

These and other features, aspects and advantages of the present invention will become understood with reference to the following description, appended claims and accompanying figures.

DETAILED DESCRIPTION

Embodiments of the invention provide a neurosynaptic network circuit comprising multiple neurosynaptic devices including a plurality of neurosynaptic core circuits for processing one or more data packets. The neurosynaptic devices further include a routing system for routing the data packets between the core circuits. At least one of the neurosynaptic devices is faulty. The routing system is configured for selectively bypassing each faulty neurosynaptic device when processing and routing the data packets.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

Figure 1:
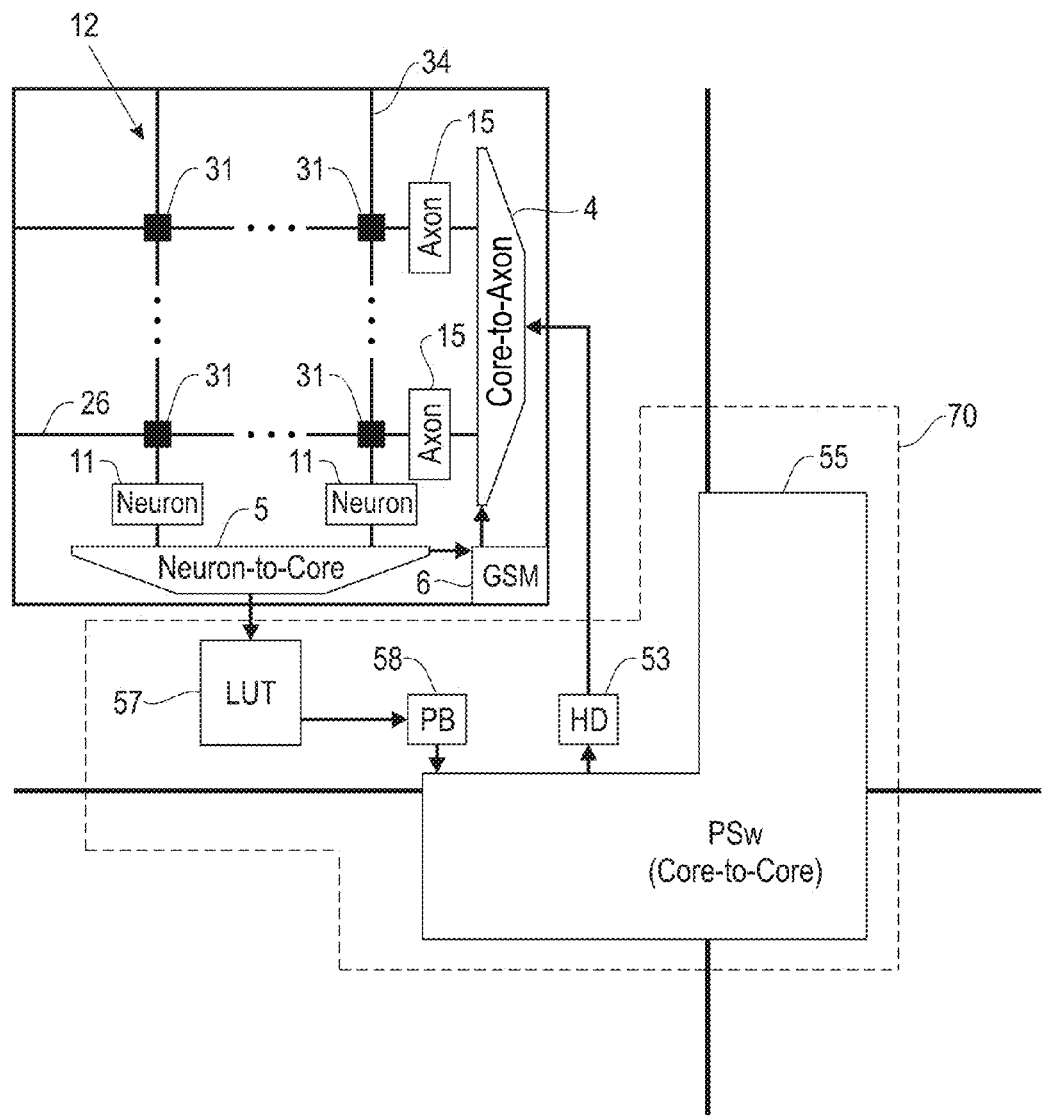
FIG. 1 illustrates an example neurosynaptic core circuit ("core circuit"), in accordance with an embodiment of the invention.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises one or more packet routing systems 70. Each packet routing system 70 is configured to selectively route neuronal firing events among multiple core circuits 10. In one embodiment, each packet routing system 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256×256 ultra-dense crossbar array that has a pitch in the range of about 0.1 nm to 10 µm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2:
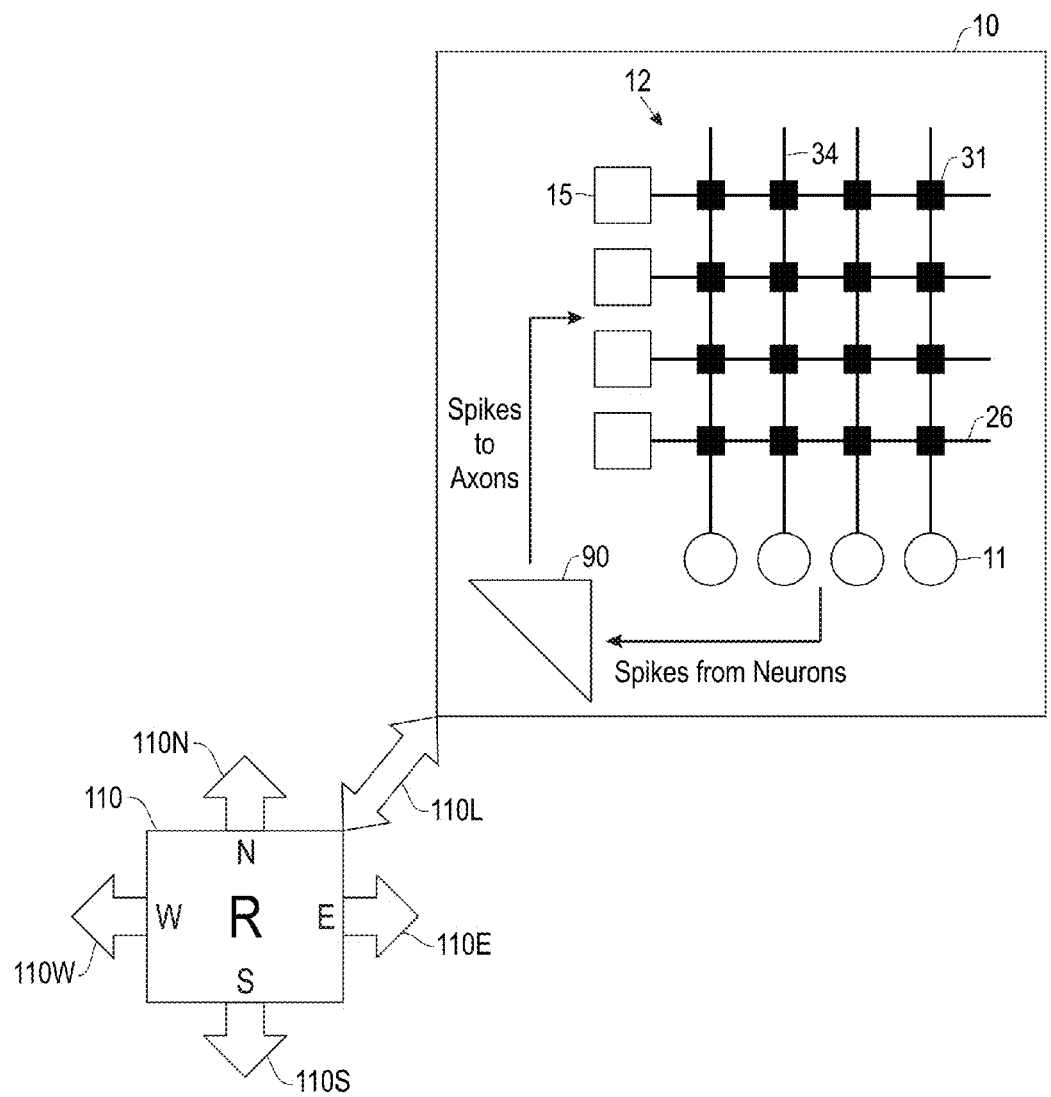
FIG. 2 illustrates an example core circuit interconnected with a corresponding packet router, in accordance with an embodiment of the invention.

FIG. 2 illustrates an example core circuit 10 interconnected with a corresponding packet router 110, in accordance with an embodiment of the invention. In one embodiment, the LUT 57, the PB 58 and the HD 53 for the core circuit 10 may be implemented as a spike interface module 90 shown in FIG. 2. The spike interface module 90 is configured to receive incoming address-event packets, wherein each incoming address-event packet includes an incoming firing event encoded as an address (e.g., an address represented as bits) representing a target axon 15. The spike interface module 90 decodes each incoming address-event packet received, and transmits an incoming firing event included in the incoming address-event packet to a target axon 15. The spike interface module 90 is further configured to receive outgoing firing events generated by the neurons 11 in the core circuit 10. The spike interface module 90 encodes/encapsulates each outgoing firing event generated as an outgoing address-event packet having the address of a target axon 15, and sends/routes the outgoing address-event packet to a core circuit 10 (e.g., the same core circuit 10 or a different core circuit 10) containing the target axon 15.

In one embodiment, a corresponding core-to-core packet switch (PSw) 55 for the core circuit 10 may be implemented as the packet router 110 shown in FIG. 2. In one embodiment, each core circuit 10 receives address-event packets from other core circuits 10 via a corresponding packet router 110, and sends address-event packets to other core circuits 10 via the corresponding packet router 110. Specifically, the packet router 110 has a northbound channel 110N, a southbound channel 110S, an eastbound channel 110E, and a westbound channel 110W for passing along packets to neighboring components in the northbound, southbound, eastbound, and westbound directions, respectively. The packet router 110 also has a local channel 110L for receiving packets generated by the corresponding core circuit 10, and sending packets targeting the corresponding core circuit 10.

As shown in FIG. 2, the local channel 110L interconnects the packet router 110 with the core circuit 10. The packet router 110 receives packets generated by the corresponding core circuit 10 via the local channel 110L, and sends packets targeting the corresponding core circuit 10 via the local channel 110L.

The northbound channel 110N interconnects the packet router 110 with an adjacent neighboring packet router 110 to the north of the packet router 110 ("north neighboring router"). The packet router 110 receives packets from the north neighboring packet router 110 via the northbound channel 110N, and sends packets to the north neighboring packet router 110 via the northbound channel 110N.

The southbound channel 110S interconnects the packet router 110 with an adjacent neighboring packet router 110 to the south of the packet router 110 ("south neighboring router"). The packet router 110 receives packets from the south neighboring packet router 110 via the southbound channel 110S, and sends packets to the south neighboring packet router 110 via the southbound channel 110S.

The eastbound channel 110E interconnects the packet router 110 with an adjacent neighboring packet router 110 to the east of the packet router 110 ("east neighboring router"). The packet router 110 receives packets from the east neighboring packet router 110 via the eastbound channel 110E, and sends packets to the east neighboring packet router 110 via the eastbound channel 110E.

The westbound channel 110W interconnects the packet router 110 with an adjacent neighboring packet router 110 to the west of the packet router 110 ("west neighboring router"). The packet router 110 receives packets from the west neighboring packet router 110 via the westbound channel 110W, and sends packets to the west neighboring packet router 110 via the westbound channel 110W.

Figure 3:
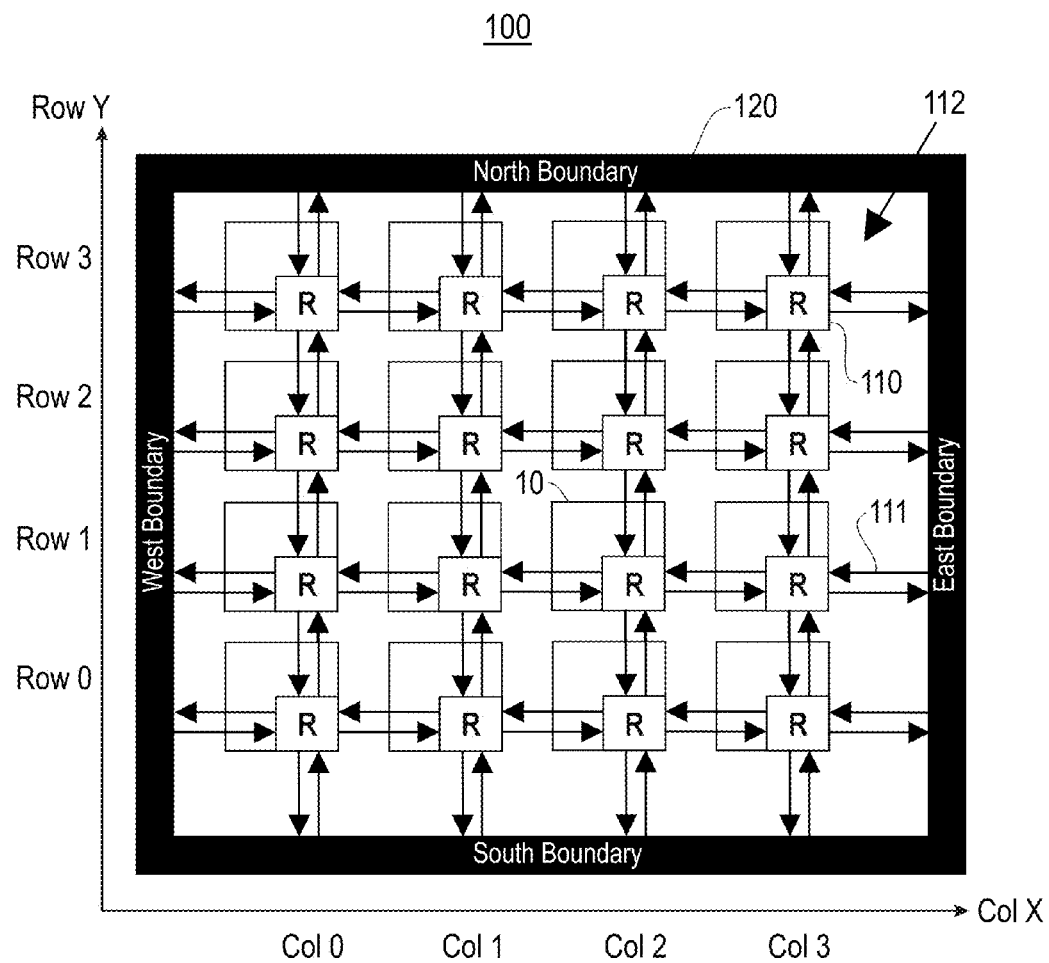
FIG. 3 illustrates an example neurosynaptic chip circuit ("chip circuit"), in accordance with an embodiment of the invention.

FIG. 3 illustrates an example neurosynaptic chip circuit ("chip circuit") 100, in accordance with an embodiment of the invention. The chip circuit 100 is a neurosynaptic network circuit comprising multiple neurosynaptic devices. The neurosynaptic devices of the chip circuit 100 include multiple interconnected core circuits 10. The chip circuit 100 is an example multi-core neurosynaptic network. In one embodiment, the core circuits 10 are arranged as a two-dimensional tile-able core array 112. Each core circuit 10 may be identified by its Cartesian coordinates as core circuit (x, y), where x is a column index and y is a row index of the core array 112 (i.e., core circuit (0,0), core circuit (0,1), . . . , (core 5,7)).

The neurosynaptic devices of the chip circuit 100 further includes a routing system for routing data between the core circuits 10. Specifically, each core circuit 10 has a corresponding packet router 110. The packet routers 110 of the chip circuit 100 are interconnected via multiple data paths (e.g., signal lines) 111. Relative to a packet router 110, each data path 111 is either an incoming data path 111 or an outgoing data path 111. Each incoming data path 111 has a reciprocal outgoing data path 111. Each channel 110L, 110N, 110S, 110E and 110W of a packet router 110 comprises at least one incoming data path 111 and at least one reciprocal outgoing data path 111.

The packet routers 110 facilitate inter-core communication. Each core circuit 10 utilizes a corresponding packet router 110 to pass along address-event packets in the eastbound, westbound, northbound, or southbound direction. Each packet router 110 receives packets from a neighboring component via at least one incoming data path 111, and sends packets to a neighboring component via at least one outgoing data path 111.

In one embodiment, an incoming data path 111 may have a buffer for maintaining incoming packets. For example, the incoming packets may be maintained in the buffer in a First In, First Out (FIFO) fashion.

As shown in FIG. 3, a packet router 110 may be interconnected to four different packet routers 110. For example, a northbound channel 110N, southbound channel 110S, an eastbound channel 110E, and a westbound channel 110W of a packet router 110 for the core circuit (2,2) may be interconnected to a southbound channel 110S of a packet router 110 for the core circuit (1,2), a northbound channel 110N of a packet router 110 for the core circuit (3,2), a westbound channel 110W of a packet router 110 for the core circuit (2,3), and an eastbound channel 110E of a packet router 110 for the core circuit (2,1), respectively.

In one embodiment, the routing of address-event packets between the core circuits 10 of the chip circuit 100 may follow dimension order routing (for example, route east-west first, then route north-south). For example, a neuron 11 of the core circuit (0,0) may generate a firing event targeting an axon 15 of the core circuit (3,3). To reach the core circuit (3,3), an address event packet including the firing event propagates from the packet router 110 for the core circuit (0,0) to the packet router 110 for the core circuit (3,3) via the packet routers 110 for the cores circuits (0,0), (0,1), (0,2) and (0,3) in the eastbound direction and the packet routers 110 for the core circuits (1,3) and (2,3) in the southbound direction.

As shown in FIG. 3, a periphery of the chip circuit 100 includes a first peripheral boundary 120 ("north boundary"), a second peripheral boundary 120 ("south boundary"), a third peripheral boundary 120 ("east boundary") and a fourth peripheral boundary 120 ("west boundary"). The periphery of the chip circuit 100 is yield critical/yield interesting (i.e., not redundant). Specifically, the periphery of the chip circuit 100 comprises a network interface 140 (FIG. 4) enabling data exchange between the chip circuit 100 and one or more other chip circuits 100.

Unlike the periphery of the chip circuit 100, the core array 112 is redundant. In one embodiment, the periphery of the chip circuit 100 occupies about 10 percent to 20 percent of the area of the chip circuit 100, whereas the core array 112 occupies about 80 percent to 90 percent of the area of the chip circuit 100.

Figure 6:
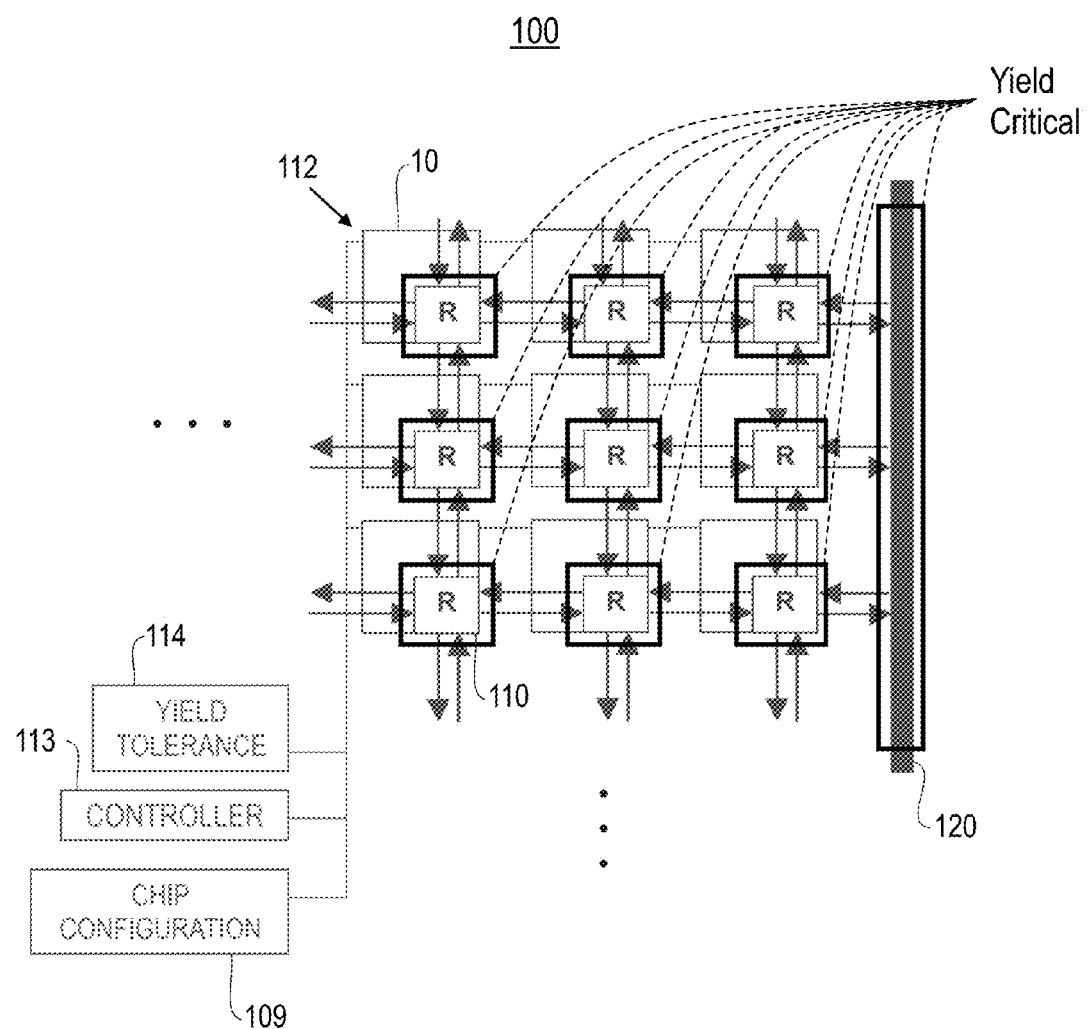
FIG. 6 illustrates a portion of an example chip circuit, in accordance with an embodiment of the invention.

In one embodiment, the chip circuit 100 (or external logic circuit or an external software module) further comprises a chip configuration unit 109 (FIG. 6), controller unit 113 (FIG. 6), and a yield tolerance unit 114 (FIG. 6). As described in detail later herein, the chip configuration unit 109 logically maps non-faulty core circuits 10 of the chip circuit 100, such that the non-faulty core circuits 10 may be used for computation/processing. At the start of each time-step, the controller unit 113 generates a synchronization signal triggering one or more core circuits 10 of the chip circuit 100 to begin neuron updates and synapse updates at the start of the time-step. As described in detail later herein, the yield tolerance unit 114 is configured to selectively disable faulty components of the chip circuit 100. A faulty component is a component of the chip circuit 100 (e.g., a packet router 110, a core circuit 10, a network interface 140 at the periphery of the chip circuit 100, etc.) with a defect.

Figure 4:
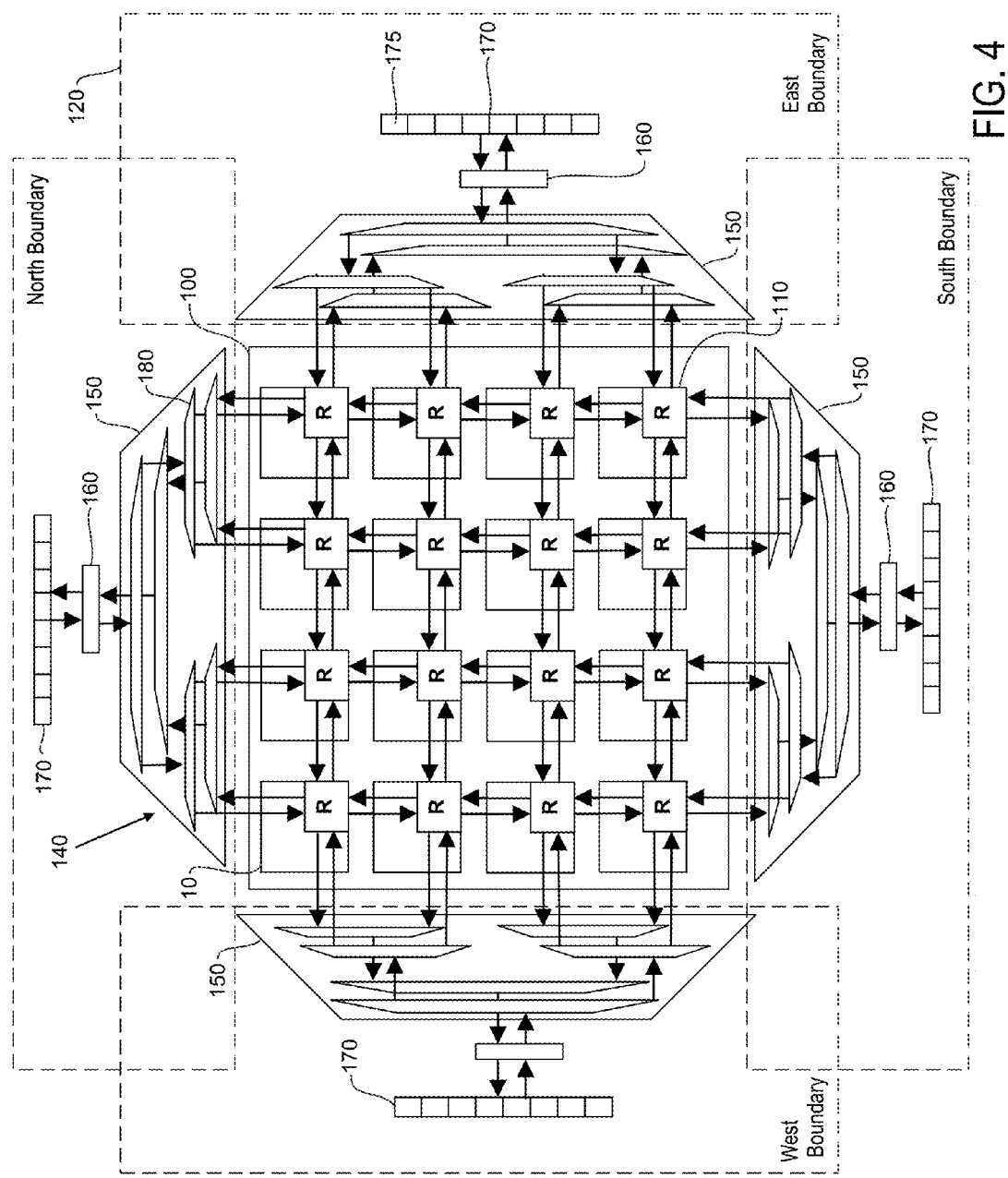
FIG. 4 illustrates an example chip circuit with an example network interface including serializing and de-serializing circuitry, in accordance with an embodiment of the invention.

FIG. 4 illustrates an example chip circuit 100 with an example network interface including serializing and de-serializing circuitry 140, in accordance with an embodiment of the invention. In one embodiment, the chip circuit 100 has a set 170 of I/O pads 175 at each peripheral boundary 120 of the chip circuit 100. As shown in FIG. 4, the chip circuit 100 may have a first set 170 at a north boundary 120, a second set 170 at a south boundary 120, a third set 170 at an east boundary 120, and a fourth set 170 at a west boundary 120. As the number of I/O pads 175 may be limited, serialization/de-serialization is required at the peripheral boundaries 120 of the chip circuit 100 to facilitate off-chip communications.

The serializing and de-serializing circuitry 140 comprises at least one funnel device 150 at the east boundary 120 for serializing outgoing data in the eastbound direction and de-serializing incoming data from the eastbound direction, at least one funnel device 150 at the west boundary 120 for serializing outgoing data in the westbound direction and de-serializing incoming data from the westbound direction, at least one funnel device 150 at the north boundary 120 for serializing outgoing data in the northbound direction and de-serializing incoming data from the northbound direction, and at least one funnel device 150 at the south boundary 120 for serializing outgoing data in the southbound direction and de-serializing incoming data from the southbound direction.

Each funnel device 150 comprises multiple funnel units 180. The funnel units 180 merge outgoing data (i.e., off-chip communications) from the chip circuit 100. In one embodiment, each funnel device 150 further comprises a corresponding packet buffering module configured to buffer packets (e.g., buffer packets in a First In, First Out (FIFO) fashion). In one embodiment, each funnel device 150 further comprises a corresponding tagging/de-tagging module. The tagging/de-tagging module is configured to tag each outgoing packet from the funnel device 150 with tag information identifying the location of a source core circuit 10 of the chip circuit 100 that generated the outgoing packet (e.g., the row/column of the core array 112 containing the source core circuit 10). Each tagged outgoing packet is routed to an input/output (I/O) pad 175 of the chip circuit 100 for delivery to another chip circuit 100.

Each funnel device 150 has a corresponding serialize and de-serialize device 160 for serializing outgoing data from the chip circuit 100, and de-serializing incoming data for the chip circuit 100 from other chip circuits 100. Incoming data from the I/O pads 175 of the chip circuit 100 are routed to a serialize/de-serialize unit 160 for un-tagging. For each incoming packet, tag information identifying a location of a core circuit 10 on the chip circuit 100 that the incoming packet targets (e.g., the row/column of the target core circuit 10 on the chip circuit 100) is removed. A corresponding funnel device 150 for the serialize/de-serialize unit 160 de-serializes incoming data, and routes each incoming packet to a target core circuit 10 on the chip circuit 100 based on tag information for the incoming packet.

In one embodiment, the chip circuit 100 includes 65 incoming data paths 111 and 65 reciprocal outgoing data paths 111 for east-west routing. Address-event packets routed east-west are encoded as 16 1in4 groups with a shared enable. The chip circuit 100 further includes 49 incoming data paths 111 and 49 reciprocal outgoing data paths 111 for north-south routing. Address-event packets routed north-south are encoded as 12 1in4 groups with a shared enable.

The funnel units 180 of each funnel device 150 may be arranged in different configurations, such as binary tree, a binary chain, or a combination of a binary tree and a binary chain. In FIG. 4, the funnels units 180 of each funnel device 150 are arranged in a binary tree.

The components at the periphery of the chip circuit 100 (i.e., each set 170 of I/O pads 175, each funnel device 150 and each serialize/de-serialize unit 160 at each peripheral boundary 120 of the chip circuit 100) are yield critical/yield interesting (i.e., not redundant).

Figure 5:
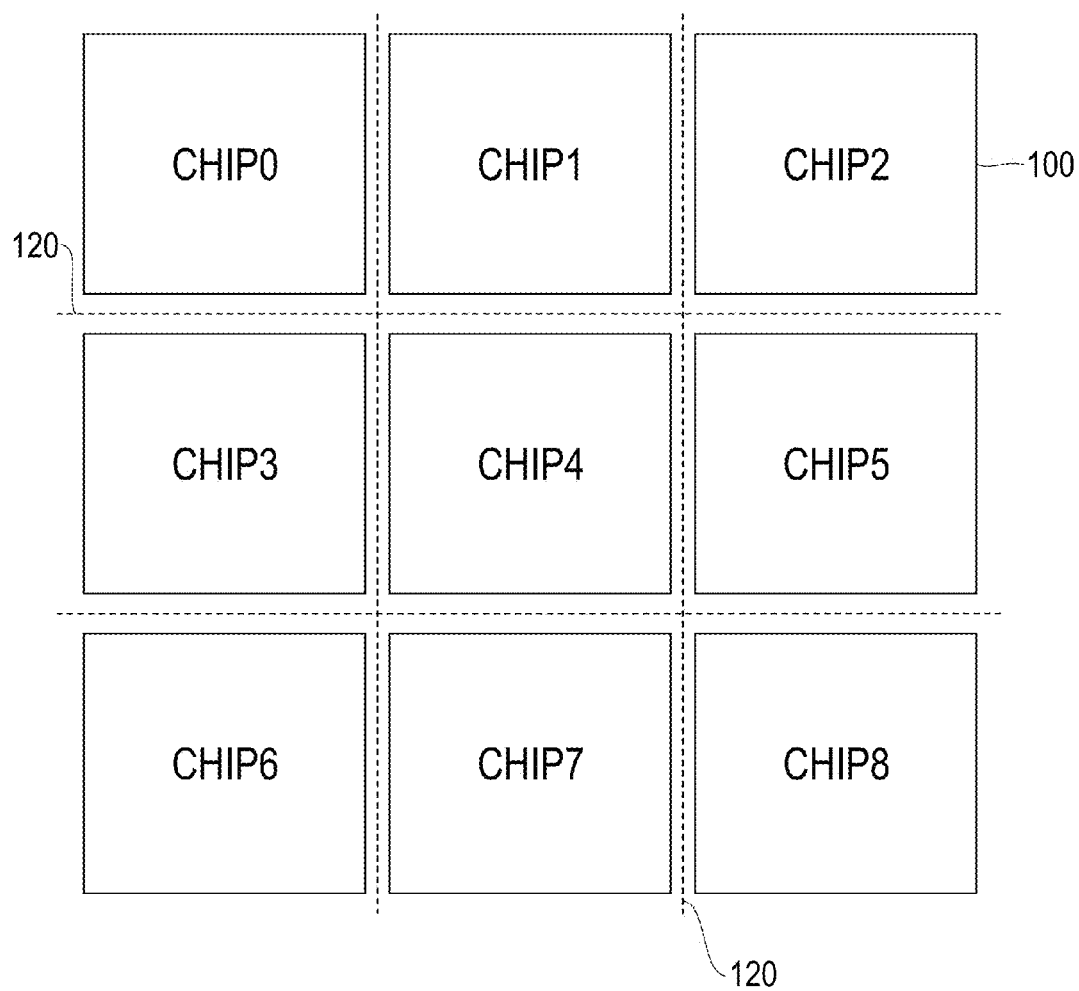
FIG. 5 illustrates an example on-board neural network system, in accordance with an embodiment of the invention.

FIG. 5 illustrates an example on-board neural network system 115, in accordance with an embodiment of the invention. The system 115 comprises multiple chip circuits 100, such as chip circuits CHIP0, CHIP1, ..., CHIP8. Each chip circuit 100 comprises a tile-able core array 112 (FIG. 3) of multiple core circuits 10.

In one embodiment, a network interface including serializing and de-serializing circuitry 140 (FIG. 4) is utilized at a periphery of each chip circuit 100 to facilitate data exchange between the chip circuit 100 and one or more other chip circuits 100. In one embodiment, multiple chip-to-chip connects interconnect the I/O pads 175 of each chip circuit 100 with the I/O pads 175 of one or more other chip circuits 100.

FIG. 6 illustrates a portion of an example chip circuit 100, in accordance with an embodiment of the invention. As stated above, each core circuit 10 has a corresponding packet router 110. Each core circuit 10 utilizes a corresponding packet router 110 to pass along address-event packets to other core circuits 10 in the eastbound, westbound, northbound, or southbound direction. Each packet router 110 of the chip circuit 100 is yield critical/yield interesting because multiple core circuits 10 make use of the packet router 110 to communicate address-event packets. A failed/faulty packet router 110 (i.e., a non-functional packet router 110) may result in network traffic leading to lost address-event packets. A failed/faulty packet router 110 may also inject spurious signals and noise into the neurosynaptic network.

In one embodiment, the packet routers 110 occupy about 14 percent of the area of the core array 112.

In one embodiment, the entire chip circuit 100 is killed (i.e., becomes useless) when the chip circuit 100 has a failed/faulty packet router 110. In another embodiment, the row and/or column of the core array 112 containing the failed/faulty packet router 110 is disabled, thereby selectively disabling the failed/faulty packet router 110. All core circuits 10 located on the same row/column as the failed/faulty packet router 110 may be optionally disabled. This allows for the failed/faulty packet router 110 and all core circuits 10 located on the disabled row and/or column to be removed from active chip configurations for computation/processing and/or routing.

As stated above, the periphery of the chip circuit 100 is also yield critical/yield interesting (i.e., not redundant). Specifically, the components at the periphery of the chip circuit 100 (i.e., each set 170 of I/O pads 175, each funnel device 150 and each serialize/de-serialize unit 160 at each peripheral boundary 120 of the chip circuit 100) are yield critical/yield interesting (i.e., not redundant).

In one embodiment, the chip circuit 100 has a corresponding scan chain for initializing components of each core circuit 10. The state of each core circuit 10 is configured by scan input comprising multiple bits for initializing components of the core circuit 10. A corresponding scan input for a core circuit 10 includes a KILLSWITCH bit and a KILLROUTER bit. In one embodiment, the yield tolerance unit 114 generates a corresponding scan input for each core circuit 10 of the chip circuit 100.

In one embodiment, setting/activating the KILLSWITCH bit for a core circuit 10 disables a controller 6 within the core circuit 10 that divides each time-step into operational phases for neuron updates, synapse updates, etc. In one embodiment, setting/activating the KILLROUTER bit for a core circuit 10 disables a corresponding packet router 110.

If a KILLSWITCH bit is set/activated for a core circuit 10, the core circuit 10 is selectively disabled, thereby removing the disabled core circuit 10 from all active chip configurations for the chip circuit 100. Each disabled core circuit 10 will not receive a synchronization signal triggering core circuits 10 of the chip circuit 100 to begin neuron updates and synapse updates at the start of a time-step. Therefore, all computation is programmed around disabled core circuits 10 of the chip circuit 100. Unless the KILLROUTER bit is set for the disabled core circuit 10, a corresponding packet router 110 retains router functionality (i.e., a packet router 110 for a core circuit 10 with an activated KILLSWITCH bit continues to communicate address-event packets).

If a KILLROUTER bit is set/activated for a core circuit 10, a corresponding packet router 110 is selectively disabled, thereby removing the disabled packet router 110 and the core circuit 10 from all active chip configurations for the chip circuit 100. All communication is programmed around disabled packet routers 110 of the chip circuit 100, and all computation is programmed around corresponding core circuits 10. Selectively disabling a faulty packet router 110 removes it from the routing system, thereby preventing the faulty packet router 110 from contaminating other non-faulty communication components of the chip circuit 100 (e.g., non-faulty packet routers 110).

In one embodiment, the yield tolerance unit 114 has a configurable COL/ROW option parameter that can be toggled between enabled and disabled. When the COL/ROW option parameter is enabled, core circuits 10 located on the same row and/or column as a faulty packet router 110 may also be selectively disabled. The yield tolerance unit 114 omits disabled core circuits 10 (i.e., core circuits 10 with an activated KILLSWITCH bit) from a possible chip configuration, and assigns a configuration (e.g., a logical label) for the disabled core circuit 10 to another core circuit 10 that has not been disabled. This allows for the faulty packet router 110 and all core circuits 10 located on the same row and/or column to be removed from active chip configurations for computation/processing and/or routing.

In this specification, let the term hardware core circuit denote a core circuit 10 with a corresponding physical label identifying a physical location of the core circuit 10 included in a chip circuit 100. In one embodiment, a physical label for a core circuit 10 is represented by Cartesian coordinates (x, y), wherein x is a column index and y is a row index of a chip circuit 100 including the core circuit 10.

In this specification, let the term software core circuit denote a core circuit 10 with a corresponding logical label identifying a logical location of the core circuit 10 included in a chip circuit 100 configured for computation/processing. Non-faulty hardware core circuits of a chip circuit 100 are logically mapped by the chip configuration unit 109 as software core circuits during configuration of the chip circuit 100. Let NumSoftwareCores denote the total number of software core circuits that a chip circuit 100 is configured to include. In one embodiment, a logical label of a core circuit 10 is represented by an integer i, wherein i is a positive integer value, and wherein $0 \leq i \leq \text{NumSoftwareCores} - 1$.

Figure 7A:
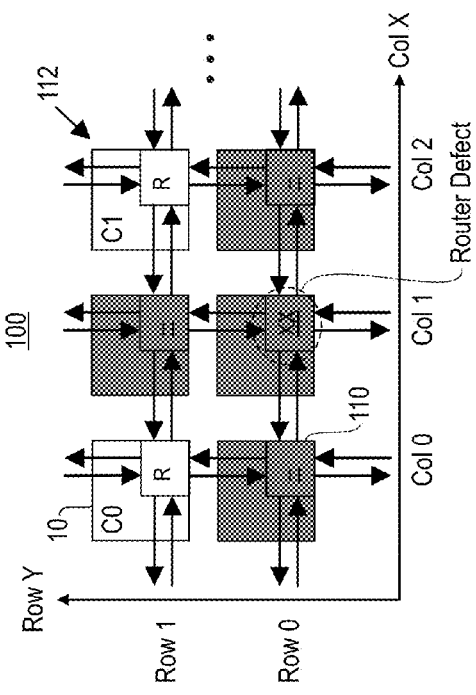
FIG. 7A illustrates example logical mapping for a portion of a chip circuit without faulty components, in accordance with an embodiment of the invention.

FIG. 7A illustrates example logical mapping for a portion of a chip circuit 100 without faulty components, in accordance with an embodiment of the invention. All of the hardware core circuits and corresponding packet routers 110 in FIG. 7A are non-faulty. As the number of faulty hardware core circuits in the chip circuit 100 is zero, each hardware core circuit in FIG. 7A is logically mapped by the chip configuration unit 109 as a software core circuit. For example, as shown in FIG. 7A, hardware core circuits with corresponding physical labels (0,0), (1,0) and (2,0) are logically mapped as software core circuits with corresponding logical labels C0, C1 and C2, respectively. As further shown in FIG. 7A, hardware core circuits with corresponding physical labels (0,1), (1,1) and (2,1) are logically mapped as software core circuits with corresponding logical labels C6, C7 and C8, respectively.

Figure 7B:
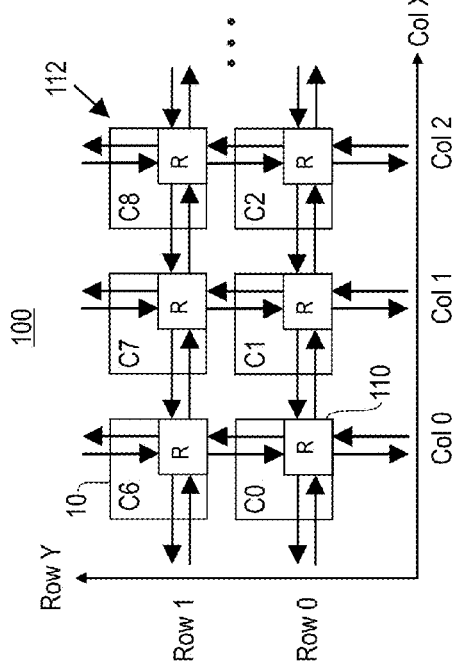
FIG. 7B illustrates example logical mapping for a portion of a chip circuit with a non-router core unit defect, in accordance with an embodiment of the invention.
Figure 7C:
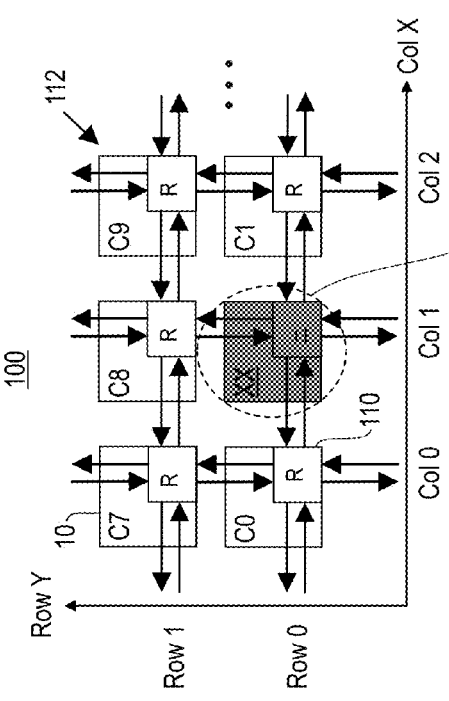
FIG. 7C illustrates example logical mapping for a portion of a chip circuit with a router defect, in accordance with an embodiment of the invention.

In this specification, let the term non-router core unit represent a core circuit 10 or any component included within the core circuit 10 with the exception of a corresponding packet router 110. Let the term non-router core unit defect represent a faulty non-router core unit. Let the term router defect represent a faulty packet router 110. In FIGS. 7B-7C, the label 'XX' is used to indicate one of a non-router core unit defect and a router defect. In FIGS. 7B-7C, the label '--' is used to indicate a packet router 110 that maintains router functionality and has a corresponding core circuit 10 that is disabled.

FIG. 7B illustrates example logical mapping for a portion of a chip circuit 100 with a non-router core unit defect, in accordance with an embodiment of the invention. As shown in FIG. 7B, a hardware core circuit with corresponding physical label (1,0) has a non-router core unit defect. A corresponding packet router 110 for the hardware core circuit with corresponding physical label (1,0), however, is non-faulty. To recover from the non-router core unit defect, all computation is programmed around the non-router core unit defect by disabling the hardware core circuit with corresponding physical label (1,0) (e.g., setting/activating the KILLSWITCH bit). The corresponding packet router 110 for the hardware core circuit with corresponding physical label (1,0) maintains its router functionality.

Therefore, with the exception of the hardware core circuit with corresponding physical label (1,0), each remaining hardware core circuit in FIG. 7B is logically mapped by the chip configuration unit 109 as a software core circuit. For example, as shown in FIG. 7B, hardware core circuits with corresponding physical labels (0,0) and (2,0) are logically mapped as software core circuits with corresponding logical labels C0 and C1, respectively, as the hardware core circuit with corresponding physical label (1,0) is disabled. As further shown in FIG. 7B, hardware core circuits with corresponding physical labels (0,1), (1,1) and (2,1) are logically mapped as software core circuits with corresponding logical labels C7, C8 and C9, respectively.

FIG. 7C illustrates example logical mapping for a portion of a chip circuit 100 with a router defect, in accordance with an embodiment of the invention. As shown in FIG. 7C, a hardware core circuit with corresponding physical label (1,0) has a corresponding packet router 110 with a router defect. All hardware core circuits physically located on the same row and/or column as the packet router 110 with the router defect are disabled.

As the packet router 110 with the router defect is located at row 0 and column 1 of the chip circuit 100, all hardware core circuits 10 at row 0 and/or column 1 are bypassed. Therefore, only hardware core circuits not located on row 0 and/or column 1 of the chip circuit 100 in FIG. 7C are logically mapped as software core circuits. For example, as shown in FIG. 7C, hardware core circuits with corresponding physical labels (0,1) and (2,1) are logically mapped as software core circuits with corresponding logical labels C0 and C1, respectively, as the hardware core circuits with corresponding physical labels (0,0), (1,0), (2, 0) and (1, 1) are disabled.

Table 1 below provides example pseudo code for implementing logical mapping in the chip configuration unit 109.

TABLE 1

```
//Initialize variable representing number of faulty core circuits in a chip circuit
NumDefective = 0
//Iterate through each software core circuit that the chip circuit is configured to include
For i = 1 to NumSoftwareCores
    //Set corresponding [x, y] coordinates for an i^th software core circuit
    //based on a size of the chip circuit and the number of faulty core circuits in the chip
    //circuit
    [x, y] = indexToSubArray(ChipSize, i+NumDefective)
    //If a KILLSWITCH bit for a hardware core circuit at coordinates [x, y] is not set/active
    If a KILLSWITCH bit for HardwareCore(x, y) is not active
        For j = i to NumSoftwareCores
            //Set corresponding coordinates [x, y] for a j^th software core circuit based
            //on a size of the chip circuit and the number of faulty core circuits in the
            //chip circuit
            (x, y) = indexToSubArray(ChipSize, i+NumDefective)
            //If a KILLSWITCH bit for a hardware core circuit at coordinates [x, y]
            //is set/active
            If a KILLSWITCH bit for HardwareCore(x, y) is active
                //Increment the number of faulty core circuits in the chip circuit
                NumDefective = NumDefective+1
            Else
                //Map the i^th software core circuit to a hardware core circuit
                //at coordinates [x, y]
                HardwareCore(X,Y) = SoftwareCore(i)
                Break For
            End If
        End For
    Else
        //Map the i^th software core circuit to a hardware core circuit at coordinates [x, y]
        HardwareCore(X,Y) = SoftwareCore(i)
    End If
End For
```

Figure 8:
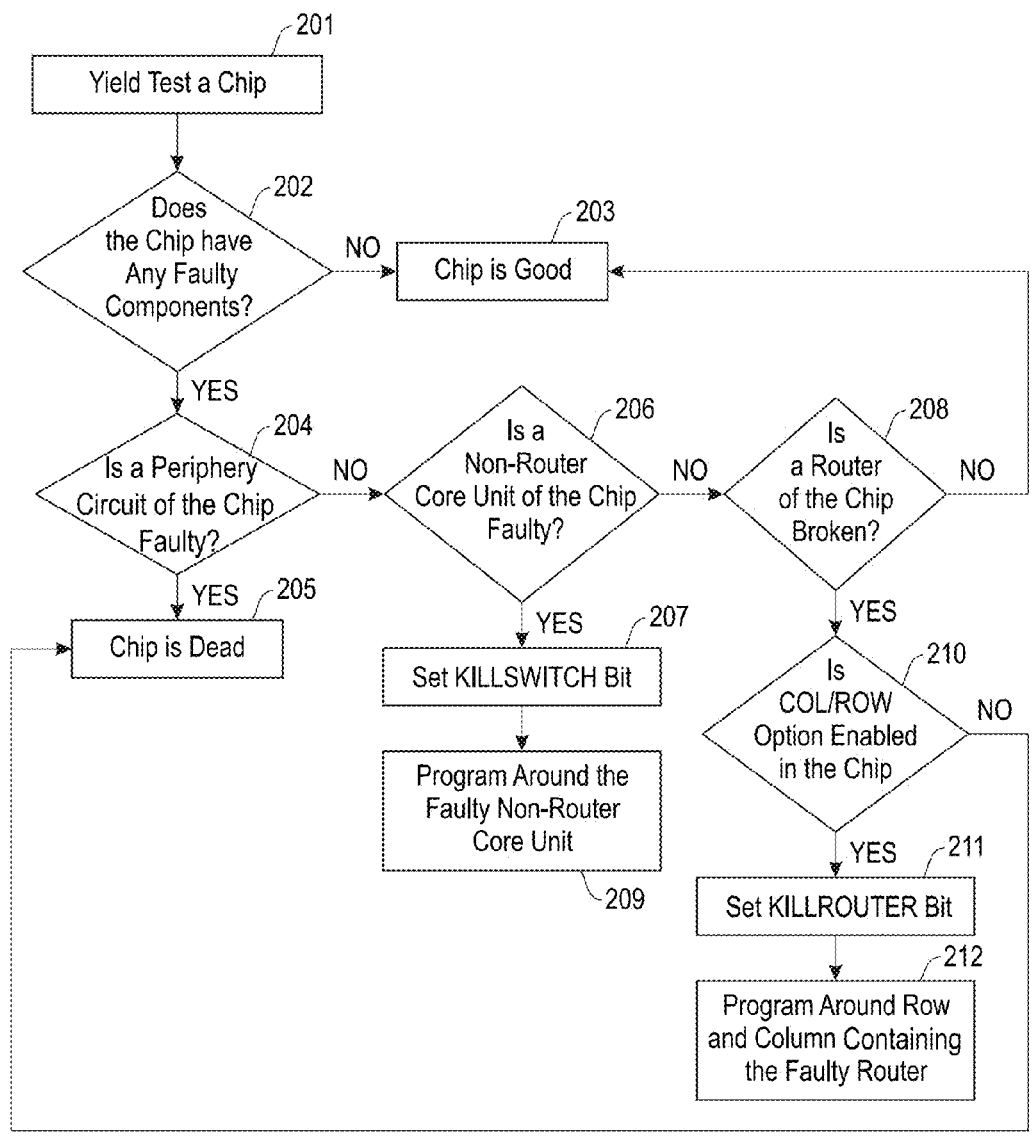
FIG. 8 illustrates a flowchart of an example process for selectively disabling a faulty component of a chip circuit, in accordance with an embodiment of the invention.

FIG. 8 illustrates a flowchart of an example process 200 for selectively disabling a faulty component of a chip circuit, in accordance with an embodiment of the invention. In process block 201, yield test a chip circuit. In process block 202, determine whether the chip circuit has any faulty components. If the chip circuit has no faulty components, proceed to process block 203 where the chip circuit is designated as good (i.e., no faulty components).

If the chip circuit has at least one faulty component, proceed to process block 204 to determine whether a periphery circuit of the chip circuit is faulty. If the periphery of the chip circuit is faulty, proceed to process block 205 where the chip circuit is designated as dead (i.e., the faulty periphery has killed the chip circuit). If the periphery of the chip circuit is not faulty, proceed to process block 206 to determine whether a non-router core unit of the chip circuit is faulty.

If the chip circuit has a faulty non-router core unit, proceed to process block 207 where the KILLSWITCH bit is set for the core circuit including the faulty non-router core unit. Setting the KILLSWITCH bit for the core circuit selectively disables the core circuit. In process block 209, all computation is programmed around the faulty non-router core unit. If the chip circuit has no faulty non-router core unit, proceed to process block 208 to determine whether a packet router of the chip circuit is faulty.

If the chip circuit has a faulty packet router, proceed to process block 210 to determine whether COL/ROW option is enabled in the chip circuit. If the COL/ROW option is enabled in the chip circuit, proceed to process block 211 where the KILLROUTER bit is set for the faulty packet router. Setting the KILLROUTER bit for the faulty packet router selectively disables the faulty packet router. In process block 212, all communication is programmed around the row and the column containing the faulty packet router. If the chip circuit has no faulty packet router, proceed to process block 205 where the chip circuit is designated as dead (i.e., the faulty packet router has killed the chip circuit).

Figure 9:
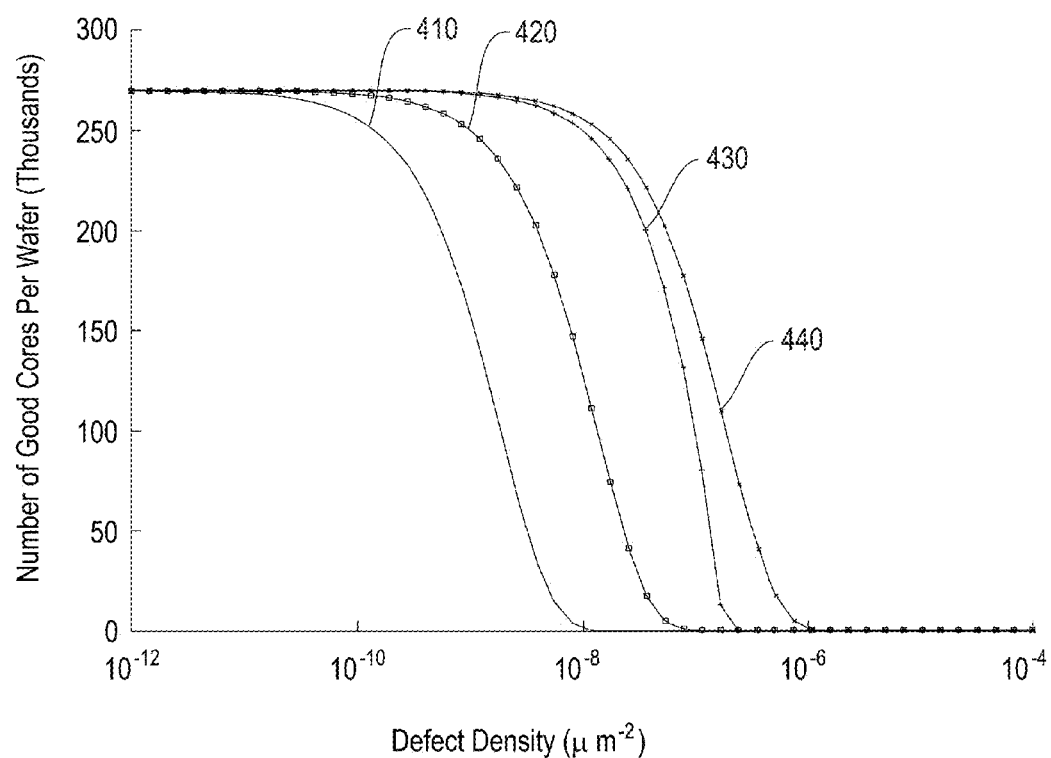
FIG. 9 illustrates yield tolerance for different example recovery mechanisms, in accordance with an embodiment of the invention.

FIG. 9 illustrates yield tolerance for different example recovery mechanisms, in accordance with an embodiment of the invention. In one embodiment, an on-board neural network system 115 comprising multiple chip circuits 100 may be instantiated using one or more wafers. A first graph 410 illustrates defect density relative to the number of non-faulty (i.e., good) core circuits per wafer for a first recovery mechanism for an on-board neural network system 115. The first recovery mechanism is an example recovery mechanism that kills an entire chip circuit when there is any defect (i.e., non-router unit defect, router defect or periphery defect) in the chip circuit.

A second graph 420 illustrates defect density relative to the number of non-faulty core circuits per wafer for a second recovery mechanism for an on-board neural network system 115. The second recovery mechanism is an example recovery mechanism that kills an entire chip circuit when there is a router defect in the chip circuit.

A third graph 430 illustrates defect density relative to the number of non-faulty core circuits per wafer for a third recovery mechanism for an on-board neural network system 115. The third recovery mechanism is an example recovery mechanism that that only kills a row and a column of a chip circuit when there is a router defect physically located at the row and the column.

A fourth graph 440 illustrates defect density relative to the number of non-faulty core circuits per wafer for a fourth recovery mechanism for an on-board neural network system 115. The fourth recovery mechanism is an example recovery mechanism that that kills an entire chip circuit only when there is a periphery defect in the chip circuit.

In one embodiment, a recovery mechanism for an on-board neural network system 115 transitions from the first graph 410 to the second graph 420 when the recovery mechanism implements setting/activating a KILLSWITCH bit for a faulty core circuit 10.

In one embodiment, a recovery mechanism for an on-board neural network system 115 transitions from the second graph 420 to the third graph 430 when the recovery mechanism implements setting/activating a KILLROUTER bit for a faulty packet router 110.

In one embodiment, a recovery mechanism for an on-board neural network system 115 transitions from the third graph 430 to the fourth graph 440 when the recovery mechanism implements a redundant routing system including redundant packet routers 110. In one example implementation, redundant packet routers 110 may increase the size of the chip circuit 100 by about 15 percent.

In one embodiment, a recovery mechanism for an on-board neural network system 115 transitions from the third graph 430 to the fourth graph 440 when the recovery mechanism implements a routing system for routing around defective chip circuits 100.

Figure 10:
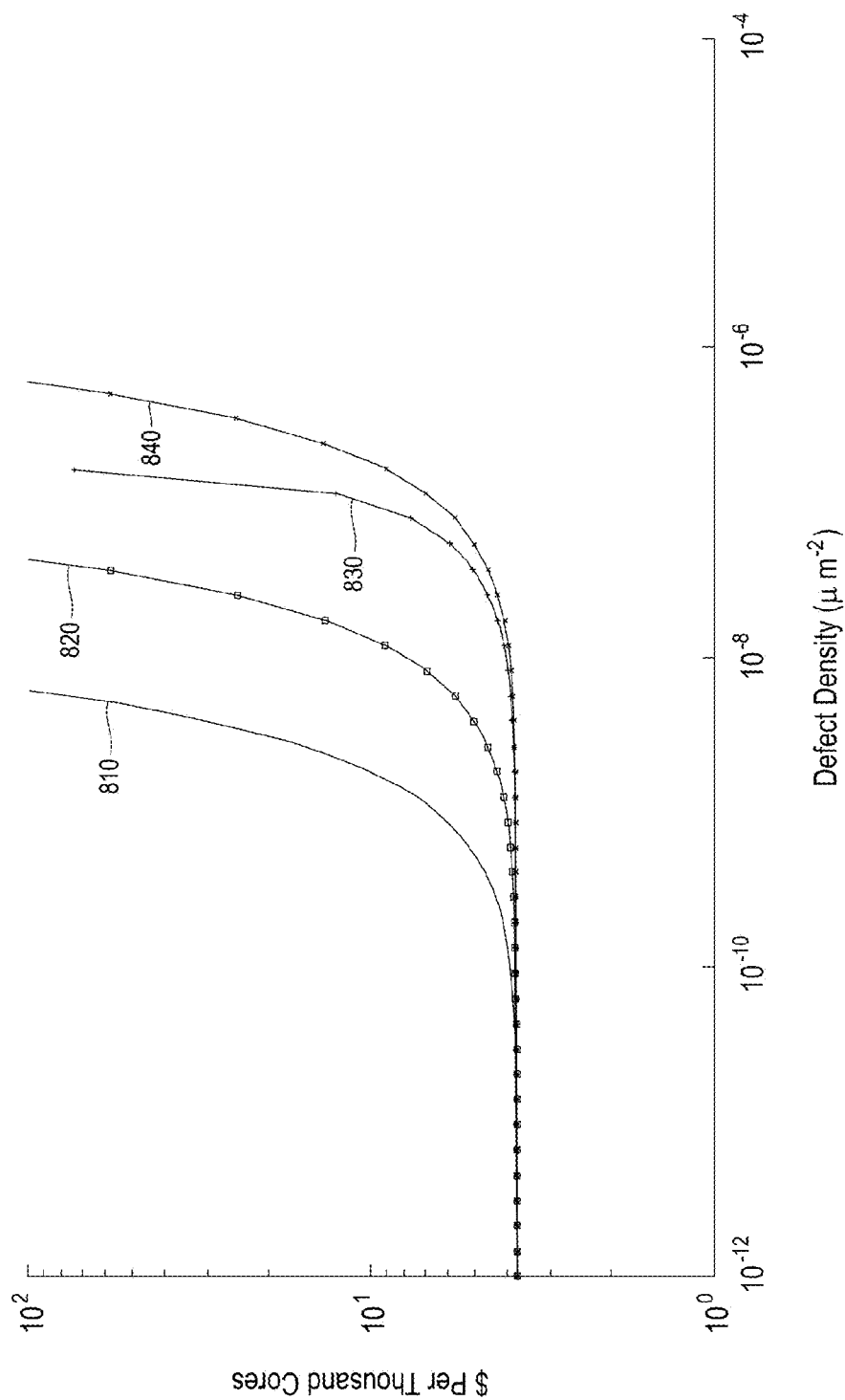
FIG. 10 illustrates cost for different example recovery mechanisms, in accordance with an embodiment of the invention.

FIG. 10 illustrates cost for different example recovery mechanisms, in accordance with an embodiment of the invention. A first graph 810 illustrates cost relative to the number of non-faulty (i.e., good) core circuits per wafer for a first recovery mechanism for an on-board neural network system 115. The first recovery mechanism is an example recovery mechanism that kills an entire chip circuit when there is any defect (i.e., non-router unit defect, router defect or periphery defect) in the chip circuit.

A second graph 820 illustrates cost relative to the number of non-faulty core circuits per wafer for a second recovery mechanism for an on-board neural network system 115. The second recovery mechanism is an example recovery mechanism that kills an entire chip circuit when there is a router defect in the chip circuit.

A third graph 830 illustrates cost relative to the number of non-faulty core circuits per wafer for a third recovery mechanism for an on-board neural network system 115. The third recovery mechanism is an example recovery mechanism that that only kills a row and a column of a chip circuit when there is a router defect physically located at the row and the column.

A fourth graph 840 illustrates cost relative to the number of non-faulty core circuits per wafer for a fourth recovery mechanism for an on-board neural network system 115. The fourth recovery mechanism is an example recovery mechanism that kills an entire chip circuit only when there is a periphery defect in the chip circuit.

In one embodiment, a recovery mechanism for an on-board neural network system 115 transitions from the first graph 410 to the second graph 420 when the recovery mechanism implements setting/activating a KILLSWITCH bit for a faulty core circuit 10.

In one embodiment, a recovery mechanism for an on-board neural network system 115 transitions from the second graph 420 to the third graph 430 when the recovery mechanism implements setting/activating a KILLROUTER bit for a faulty packet router 110.

In one embodiment, a recovery mechanism for an on-board neural network system 115 transitions from the third graph 430 to the fourth graph 440 when the recovery mechanism implements a redundant routing system including redundant packet routers 110. In one example implementation, redundant packet routers 110 may increase the size of the chip circuit 100 by about 15 percent.

In one embodiment, a recovery mechanism for an on-board neural network system 115 transitions from the third graph 430 to the fourth graph 440 when the recovery mechanism implements a routing system for routing around defective chip circuits 100.

Figure 11:
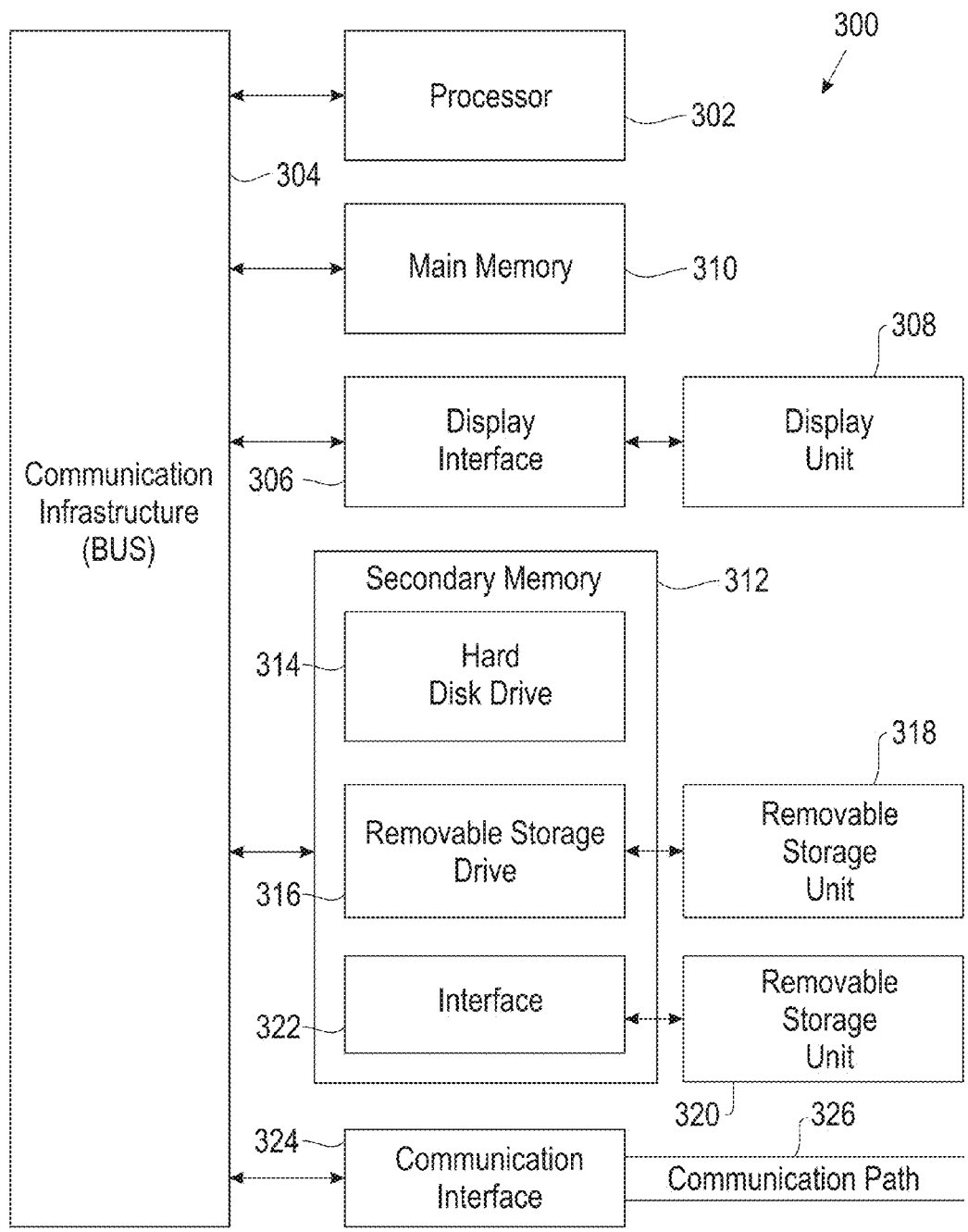
FIG. 11 is a high level block diagram showing an information processing system useful for implementing one embodiment of the present invention.

FIG. 11 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for yield tolerance in a neurosynaptic system. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neurosynaptic network circuit, comprising:
multiple neurosynaptic devices comprising a plurality of neurosynaptic core circuits for processing one or more data packets; and
said multiple neurosynaptic devices further comprising a routing system for routing said one or more data packets between said plurality of neurosynaptic core circuits;
wherein each neurosynaptic core circuit has a corresponding set of bits indicative of whether said neurosynaptic core circuit is available for processing said one or more data packets; and
wherein said routing system is configured for selectively bypassing at least a portion of said neurosynaptic network circuit based on a recovery mechanism when processing and routing said one or more data packets, said recovery mechanism selected from a set of different recovery mechanisms with different yield tolerances and different costs based on a type of faulty neurosynaptic device detected in said neurosynaptic network circuit, a location of said faulty neurosynaptic device, and a corresponding set of bits of at least one neurosynaptic core circuit of said plurality of neurosynaptic core circuits, and said recovery mechanism transitions to another recovery mechanism selected from said set of different recovery mechanisms in response to a change of one or more bits of said corresponding set of bits.

2. The neurosynaptic network circuit of claim 1, wherein:
each neurosynaptic core circuit comprises multiple electronic neurons, multiple electronic axons, and a plurality of electronic synapse devices interconnecting said multiple neurons with said multiple axons.

3. The neurosynaptic network circuit of claim 1, wherein:
each neurosynaptic device is tested by a yield tolerance unit to determine whether said neurosynaptic device has a defect; and
each neurosynaptic device with a defect is selectively disabled by said yield tolerance unit.

4. The neurosynaptic network circuit of claim 3, wherein:
said yield tolerance unit is one of the following: an on-board yield tolerance unit included in said neurosynaptic network circuit, and an off-board yield tolerance unit.

5. The neurosynaptic network circuit of claim 3, wherein:
a neurosynaptic device with a defect is a faulty neurosynaptic device;
a faulty neurosynaptic device is one of the following types of faulty neurosynaptic devices: a neurosynaptic core circuit with a defect, or a packet router of said routing system with a defect;
in response to determining a faulty neurosynaptic device is a neurosynaptic core circuit with a defect at a periphery of said neurosynaptic core circuit, a recovery mechanism selected bypasses said entire neurosynaptic core circuit;
in response to determining a faulty neurosynaptic device is a packet router with a defect, a recovery mechanism selected bypasses a row or a column of an array that includes said packet router; and
each neurosynaptic device with a defect is removed from an active configuration of said neurosynaptic network circuit.

6. The neurosynaptic network circuit of claim 3, wherein:
each neurosynaptic core circuit is tested by said yield tolerance unit to determine whether said neurosynaptic core circuit has a defect;
for each neurosynaptic core circuit with a defect, said yield tolerance unit selectively disables said neurosynaptic core circuit by activating a first bit of a corresponding set of bits, said activated first bit indicating that said neurosynaptic core circuit is disabled; and
a recovery mechanism selected transitions to another recovery mechanism selected from said set of recovery mechanisms in response to an activation of one or more bits of a corresponding set of bits for at least one neurosynaptic core circuit of said plurality of neurosynaptic core circuits.

7. The neurosynaptic network circuit of claim 6, wherein:
each disabled neurosynaptic core circuit is removed from an active configuration of said neurosynaptic network circuit.

8. The neurosynaptic network circuit of claim 7, wherein:
each neurosynaptic core circuit without a defect is logically mapped by a configuration unit, such that only logically mapped neurosynaptic core circuits are used for processing said one or more data packets.

9. The neurosynaptic network circuit of claim 8, wherein:
said configuration unit is one of the following: an on-board configuration unit included in said neurosynaptic network circuit, and an off-board configuration unit.

10. The neurosynaptic network circuit of claim 3, wherein:
said routing system is tested by said yield tolerance unit to determine whether said routing system has a defect.

11. The neurosynaptic network circuit of claim 10, wherein:
said routing system comprises multiple redundant packet routers, wherein each neurosynaptic core circuit has at least once corresponding redundant packet router.

12. The neurosynaptic network circuit of claim 11, wherein:
each packet router is tested by said yield tolerance unit to determine whether said packet router has a defect; and
for each packet router with a defect, said yield tolerance unit selectively disables said packet router by activating a second bit of a corresponding set of bits for a neurosynaptic core circuit corresponding to said packet router, said activated second bit indicating that said packet router is disabled.

13. The neurosynaptic network circuit of claim 12, wherein:
said multiple neurosynaptic core circuits are arranged as an array including multiple rows and multiple columns;
for each disabled packet router located at a row and a column of said array, all neurosynaptic core circuits located on one of said row and said column are disabled; and
said set of different recovery mechanisms comprise at least one of: a first recovery mechanism that kills said entire neurosynaptic network circuit in response to any defect in said neurosynaptic network circuit, a second recovery mechanism that kills said entire neurosynaptic network circuit in response to a packet router with a defect in said neurosynaptic network circuit, a third recovery mechanism that kills a row and a column of said array in response to a packet router with a defect physically located at said row and said column of said array, and a fourth recovery mechanism that kills said entire neurosynaptic network circuit only in response to a defect at a periphery of said neurosynaptic network circuit.

14. The neurosynaptic network circuit of claim 13, wherein:
for each disabled packet router located at a row and a column of said array, all neurosynaptic core circuits located on one of said row and said column are removed from an active configuration of said neurosynaptic network circuit.

15. A method of configuring a neurosynaptic network circuit, comprising:
routing one or more data packets between a plurality of neurosynaptic devices included in said neurosynaptic network circuit, wherein said neurosynaptic network circuit comprises a plurality of neurosynaptic core circuits for processing said one or more data packets and a routing system for routing said one or more data packets, and each neurosynaptic core circuit has a corresponding set of bits indicative of whether said neurosynaptic core circuit is available for processing said one or more data packets; and
selectively bypassing at least a portion of said neurosynaptic network circuit based on a recovery mechanism when processing and routing said one or more data packets, wherein said recovery mechanism is selected from a set of different recovery mechanisms with different yield tolerances and different costs based on a type of faulty neurosynaptic device detected in said neurosynaptic network circuit, a location of said faulty neurosynaptic device, and a corresponding set of bits of at least one neurosynaptic core circuit of said plurality of neurosynaptic core circuits, and said recovery mechanism transitions to another recovery mechanism selected from said set of different recovery mechanisms in response to a change of one or more bits of said corresponding set of bits.

16. The method of claim 15, further comprising:
testing each neurosynaptic device to determine whether said neurosynaptic device has a defect;
selectively disabling each neurosynaptic device with a defect; and
removing each neurosynaptic device with a defect from an active configuration of said neurosynaptic network
wherein a neurosynaptic device with a defect is a faulty neurosynaptic device;
wherein a faulty neurosynaptic device is one of the following types of faulty neurosynaptic devices: a neurosynaptic core circuit with a defect, or a packet router of said routing system with a defect;
wherein in response to determining a faulty neurosynaptic device is a neurosynaptic core circuit with a defect at a periphery of said neurosynaptic core circuit, a recovery mechanism selected bypasses said entire neurosynaptic core circuit; and
wherein in response to determining a faulty neurosynaptic device is a packet router with a defect, a recovery mechanism selected bypasses a row or a column of an array that includes said packet router.

17. The method of claim 16, further comprising:
testing each neurosynaptic core circuit to determine whether said neurosynaptic core circuit has a defect; and
for each neurosynaptic core circuit with a defect, selectively disabling said neurosynaptic core circuit by activating a first bit of a corresponding set of bits, said activated first bit indicating that said neurosynaptic core circuit is disabled; and
removing each disabled neurosynaptic core circuit from an active configuration of said neurosynaptic network;
wherein a recovery mechanism selected transitions to another recovery mechanism selected from said set of recovery mechanisms in response to an activation of one or more bits of a corresponding set of bits for at least one neurosynaptic core circuit of said plurality of neurosynaptic core circuits.

18. The method of claim 16, further comprising:
testing said routing system to determine whether said routing system has a defect; wherein said multiple neurosynaptic core circuits are arranged as an array including multiple rows and multiple columns;
wherein said routing system comprises multiple redundant packet routers; and
wherein each neurosynaptic core circuit has at least once corresponding redundant packet router.

19. The method of claim 18, further comprising:
testing each packet router to determine whether said packet router has a defect;
for each packet router with a defect, selectively disabling said packet router by activating a second bit of a corresponding set of bits for a neurosynaptic core circuit corresponding to said packet router, said activated second bit indicating that said packet router is disabled;
for each disabled packet router located at a row and a column of said array, disabling all neurosynaptic core circuits located on one of said row and said column;
for each disabled packet router located at a row and a column of said array, removing all neurosynaptic core circuits located on one of said row and said column from an active configuration of said network circuit; and
said set of different recovery mechanisms comprise at least one of: a first recovery mechanism that kills said entire neurosynaptic network circuit in response to any defect in said neurosynaptic network circuit, a second recovery mechanism that kills said entire neurosynaptic network circuit in response to a packet router with a defect in said neurosynaptic network circuit, a third recovery mechanism that kills a row and a column of said array in response to a packet router with a defect physically located at said row and said column of said array, and a fourth recovery mechanism that kills said entire neurosynaptic network circuit only in response to a defect at a periphery of said neurosynaptic network circuit.

20. A computer program product for configuring a neurosynaptic network circuit, the computer program product comprising a computer-readable storage medium having program code embodied therewith, the program code being executable by a computer to:
route one or more data packets between a plurality of neurosynaptic devices included in said neurosynaptic network circuit, wherein said neurosynaptic network circuit comprises a plurality of neurosynaptic core circuits for processing said one or more data packets and a routing system for routing said one or more data packets, and each neurosynaptic core circuit has a corresponding set of bits indicative of whether said neurosynaptic core circuit is available for processing said one or more data packets; and
selectively bypass at least a portion of said neurosynaptic network circuit based on a recovery mechanism when processing and routing said one or more data packets, wherein said recovery mechanism is selected from a set of different recovery mechanisms with different yield tolerances and different costs based on a type of faulty neurosynaptic device detected in said neurosynaptic network circuit, a location of said faulty neurosynaptic device, and a corresponding set of bits of at least one neurosynaptic core circuit of said plurality of neurosynaptic core circuits, and said recovery mechanism transitions to another recovery mechanism selected from said set of different recovery mechanisms in response to a change of one or more bits of said corresponding set of bits.

\* \* \* \* \*